United States Patent
Primlani

(10) Patent No.: US 6,955,052 B2
(45) Date of Patent: Oct. 18, 2005

(54) THERMAL GAS COMPRESSION ENGINE

(76) Inventor: Indru J. Primlani, 2616 NE. 19$^{TH}$ St., Renton, WA (US) 98056

( * ) Notice: Subject to any disclaimer, the term of this patent is extended or adjusted under 35 U.S.C. 154(b) by 0 days.

(21) Appl. No.: 10/733,898

(22) Filed: Dec. 11, 2003

(65) Prior Publication Data

US 2005/0126177 A1     Jun. 16, 2005

(51) Int. Cl.$^7$ ............................. F02C 9/00; F02C 5/02; F02C 7/10
(52) U.S. Cl. ................ 60/776; 60/39.29; 60/39.38; 60/39.76; 60/39.5; 60/39.511
(58) Field of Search ..................... 60/39.21, 39.38, 60/39.76, 39.6, 39.62, 69.5, 39.511, 39.41, 60/776

(56) References Cited

U.S. PATENT DOCUMENTS

| | | | |
|---|---|---|---|
| 3,358,656 A | 3/1966 | Panhard | |
| 3,775,973 A * | 12/1973 | Hudson | 60/39.25 |
| 4,024,703 A * | 5/1977 | Hudson | 60/773 |
| 4,205,638 A | 6/1980 | Vlacancinch | |
| 4,693,075 A * | 9/1987 | Sabatiuk | 60/39.39 |
| 5,771,682 A | 6/1998 | Simons | |
| 5,960,625 A * | 10/1999 | Zdvorak, Sr. | 60/39.34 |
| 6,203,587 B1 | 3/2001 | Lesieur et al. | |
| 6,523,743 B1 | 2/2003 | Patterson et al. | |
| 6,527,828 B2 | 3/2003 | Flippo et al. | |
| 6,545,191 B1 | 4/2003 | Stauffer | |

* cited by examiner

Primary Examiner—Charles G. Freay

(57) ABSTRACT

A power generation method and apparatus includes a plurality of gas reactors that combust fuel and an oxygen-containing gas under substantially adiabatic conditions such that hot high pressure combustion gases flow alternately and substantially continuously from each reactor to a work-producing device wherein the combustion gases are expanded to provide work. A portion of the expanded gases, or ambient air can be mixed with the combustion gases to form a mixture of gases fed to the work-producing device.

28 Claims, 4 Drawing Sheets

THERMAL GAS COMPRESSION ENGINE

CROSS-REFERENCE TO RELATED APPLICATION

Oxyhydrogen Steam Generator. Ser. No. 09/771,341—Indru Primlani

BACKGROUND OF THE INVENTION

This invention relates to engines and distributive power systems with remote combustion. Lower temperature and pressure working fluids are used to produce useful work.

State of the art engines have thermal efficiencies in the range of 30 to 40%. This is due to heat lost by system cooling, friction of moving parts and energy lost in exhaust gases. In order to meet atmospheric emission standards additional energy is used to condition exhaust gases for reducing the toxicity.

Most engines use the internal combustion process. Steam engines use external combustion. Gas turbines operate with pressurized gases at very high temperatures. The turbines have a very high power to weight ratio but are not good for partial loads; they are very costly because of high temperatures and speeds of operation. Jet engines use power of gas turbines. Turbofan engines are more efficient due to pick up of heat from the shell of the engine. Engines operate with increasing entropy due to irreversible heat transfer processes during operation of cooling systems, exhaust systems and accessories. Some engines power gas turbines with exhaust gases to drive air compressors to increase the density of combustion air and to increase the mass of Oxygen in the air introduced into the engine for increased power output. Operating at higher altitudes aspirating engines produce less power. All engines require special considerations for materials used for internals subjected to high temperatures and pressures. Bearing and other moving parts are subject to short term high temperature yield stresses, short term ultimate yield, rupture strength, creep strength, relaxation strength, high temperature endurance limit, thermal expansion, corrosion and failures due to fatigue and natural frequencies of operation.

The primary object of this invention is to substantially reduce the cost of manufacture and operation of an energy-producing system with less impact on the environment. Specifically the following objects are cited:
  a. Conserve energy of fuel combustion, compressed air and unburned fuel instead of discharging it through coolants;
  b. Conserve energy remaining in expanded gases issuing from a work-producing zone by circulating expanded gases in a closed loop with gaseous combustion products exhausted;
  c. Maximize combustion of fuel and preferably obtain complete combustion with reduced flame temperature, so products of combustion contain only traces of Hydrocarbons and Carbon Monoxide and Oxides of Nitrogen;
  d. Eliminate or minimize the need for treating exhaust gases for toxicity and noise.

BRIEF SUMMARY OF THE INVENTION

The present invention provides a system for power generation from the substantially adiabatic combustion of a mixture of fuel and an Oxygen-containing gas such as air, in a sealed chamber of constant volume. After ignition of the combustible mixture, the temperature and pressure of the resulting combustion gases rise to a predetermined range, after which the gases are fed to and through a work-producing zone that provides work by expansion of the hot high-pressure gases. A second sealed chamber is operated in sequence, in the same way, so that the combustion gases from the second chamber flow to the work-producing zone as the gases from the first chamber are being exhausted, whereupon the cycle is repeated to provide a substantially continuous flow of hot, high-pressure gases to the work-producing zone for expansion therein.

In a preferred embodiment of the invention, a portion of the expanded gases exiting the work-producing zone is recycled to a mixer downstream of the chambers and upstream of the work-producing zone to form an admixture of the higher temperature, higher pressure combustion gases and the lower temperature and lower pressure expanded gases, and the admixture of gases is fed to and through the work-producing zone for expansion therein. Alternatively, ambient air is fed into the mixer to be admixed with the combustion gases, and the thus formed admixture is expanded in the work-producing zone to produce work.

The advantages and benefits of this invention include the following:
  Engines of presently operating vehicles can be replaced with gas motors comprising simple low cost turbines or double acting reciprocating piston devices to produce more power and improved fuel economy. The replaced units have less inertia, less friction and longer life with simple and permanent lubrication [no oil changes required]. Also the power system of the invention releases less toxic pollutants and Global warming gases.
  Portable and stationary power plants using the invention will cost less to fabricate and less to operate. Self-propelled power plants will be lighter than the state of the art and atmospheric emissions are expected to exceed EPA 2004 promulgated standards.
  Operation and maintenance of the present invention is more cost efficient because the engine has no moving parts. Problems due to high temperatures in apparatus in a static condition is significantly easier than for apparatus in dynamic conditions.
  Other advantages are described herein after.

DETAILED DESCRIPTION OF THE INVENTION

Figure 1:
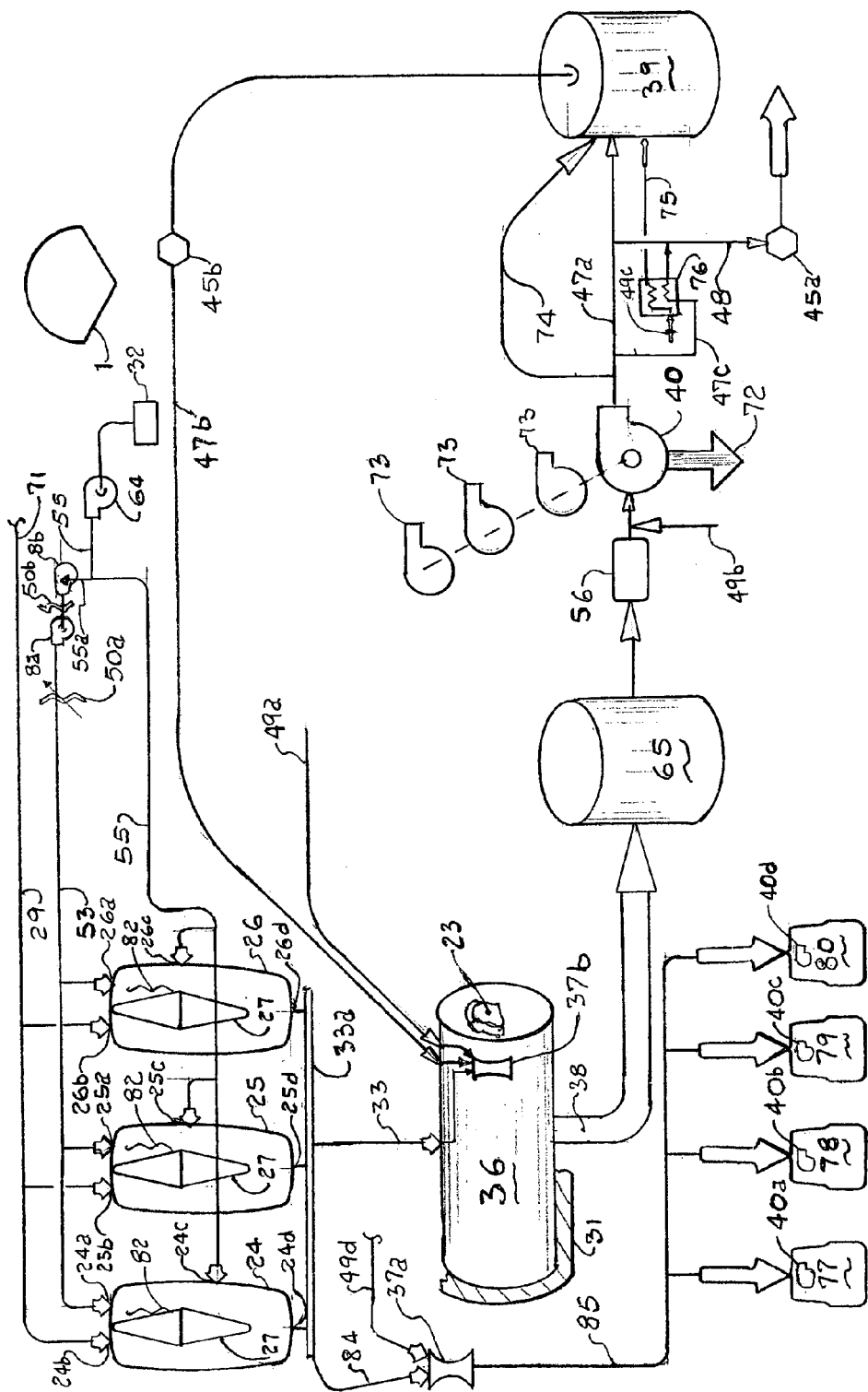
FIG. 1 is a schematic view of the process and apparatus of the invention.

With reference to FIG. 1, three gas reactors 24, 25 and 26 are controlled by computer 1 to operate in sequence as described in detail below. Each reactor 24, 25, and 26 is sealed and has a predetermined volume. An oxygen-containing gas, preferably compressed air at a pressure of from about 25 to 500 PSIA, preferably from about 100 to 150 PSIA, is charged into each reactor 24, 25 and 26. [For convenience the oxygen-containing gas will be referred to as compressed air.] Compressed air is provided via supply line 53 and air inlets 24a, 25a and 26a. After charging the reactors with the compressed air, a combustible fuel, preferably compressed natural gas or pressurized ethanol, containing about 5 to 15 percent water, is charged into the reactors 24, 25 and 26 from fuel supply 71 via line 29 and fuel inlets 24b, 25b and 26b. After charging the reactors with the compressed gaseous fuel or pressurized liquid fuel, the pressure in each reactor is approximately equal to the pressure of the compressed air. The reactors 24, 25 and 26 are charged with an amount of compressed air in excess of the stoichiometric requirements for combustion of the fuel.

Preferably, water is also charged into the reactors 24,25 and 26 via water inlets 24c, 25c and 26c from water pump 64 and line 55 which draws water from water reservoir 32. Water pump 64 also supplies water, if desired, via line 55a directly to the air compressor 8b with cooled compressed air flowing through line 53 that has been cooled in heat exchangers 50a and 50b and can be further cooled by evaporating water.

After a combustible mixture of fuel and compressed air has been charged into the reactors, the combustible mixture is ignited by igniter 82, first in reactor 24 and then in reactors 25, 26 to produce a flame propagating in the flame retainer 27. FIG. 3 shows flame retainer 27 in detail and will be discussed herein below. Gaseous combustion products at an elevated temperature of from about 2100° F. to about 3000° F. and at an elevated pressure of from about 800 PSIA to about 4000 PSIA, exit reactor 24 via outlet 24d and are charged into mixing tank 36 via manifold 33a. Mixing tank 36 has an internal high temperature lining 23 [FIG. 2] and external insulation 31. The combustible mixture is sequentially ignited in reactors 25 and 26 such that there is a substantially continuous flow of gas into mixing tank 36 from reactor 25 and outlet 25d and then from reactor 26 and outlet 26d via manifold 33a. At the end of each cycle of sequential ignition, a new cycle is commenced in the same manner as described above. If desired, more than three reactors or as few as two reactors may be used.

The gases of combustion at elevated temperature and pressure enter tank 36 via line 33 and exit tank 36 via line 38 and flow into accumulator tank 65 and thence into rotary gas motor 40, which is controlled by motor speed and torque controller 56. The gas motor 40 expands the gases charged therein and the work produced is collected via line 72 in a conventional manner. If desired, several gas motors 73 can be arranged in series-parallel to receive the gas from accumulator tank 65 to provide a distributive power system.

In a preferred embodiment of the invention, a portion of the expanded gases exiting gas motor 40, as secondary gases, are passed through line 47a and/or line 74 into accumulator tank 39. The secondary gas exiting tank 39, at a pressure of from about 15 to 30 PSIA and a temperature of about 140° F. to 200° F., is sent to mixing tank 36 via line 47b and gas scrubber 45b to remove entrained moisture.

Alternatively, gases exiting gas motor 40 through line 47c, pass through condenser 76 to preheat ambient air introduced via line 49c. The preheated ambient air stream is in fluid communication with accumulator tank 39 via line 75. Exhaust gases may be exhausted through line 48 and gas scrubber 45a and become a part of the exhaust stream that is exhausted.

Generally when the gas motor powers a self propelled vehicle [not shown] substantial energy expended to drive said vehicle may be recovered by converting said gas motor 40 to a power driven generator by virtue of the momentum energy of said vehicle. This is accomplished by controller 56 and means to shut off power gases while opening ports [see FIG. 2] to admit ambient air 49b to be pressurized within gas motors 40,73. The pressurized air is in fluid communication via line 74 with accumulator tank 39. Pressurizes secondary gases require less energy from the reactor gases to be converted to power gases that drive said gas motors.

If desired, the ambient air can be charged into mixing tank 36 via line 49a instead of the recycled expanded gas [secondary gas] in line 47b. In any case, it is preferable to admix the combustion gases exiting the reactor 24, 25, 26 with a lower pressure and temperature secondary gas, such as the recycled expanded gas or ambient air, in a ratio by mass of about 3 parts to about 6 parts of secondary gas to about one part of the combustion gases. This has several advantages. First, this provides a substantially improved thermal efficiency, because heat in the combustion gases is transferred to the secondary gases and is not lost to the environment. Further, by reducing the temperature and pressure of the power gases in line 38 sent to the gas motors, the cost of building and operating the gas motors is substantially reduced and the operating life is substantially extended. Moreover, mixing the combustion gases with the secondary gases increases the volume of the power gases, which in turn enable the gas motors to produced the desired horsepower output.

Because the mixing tank 36 and the reactors 24, 25 and 26 are thermally insulated, the combustion occurs under substantially adiabatic conditions and heat, losses are substantially reduced, which increases the thermal efficiency of the system. If desired, the hot combustion gases exiting the reactors can be sent via lines 84 and 85 and eductor 37a, which will induct ambient air from line 49c, to form a mixture of gases, which in turn is sent to a space heating system 77, a distributive cooking system 78, a hot water system 79 and/or a clothes dry system 80. In each case, the combustion gases mixed with ambient air are expanded in gas motors 40a, 40b, 40c and 40d and provides the energy to drive the gas motors and the heat required for these systems.

Figure 4:
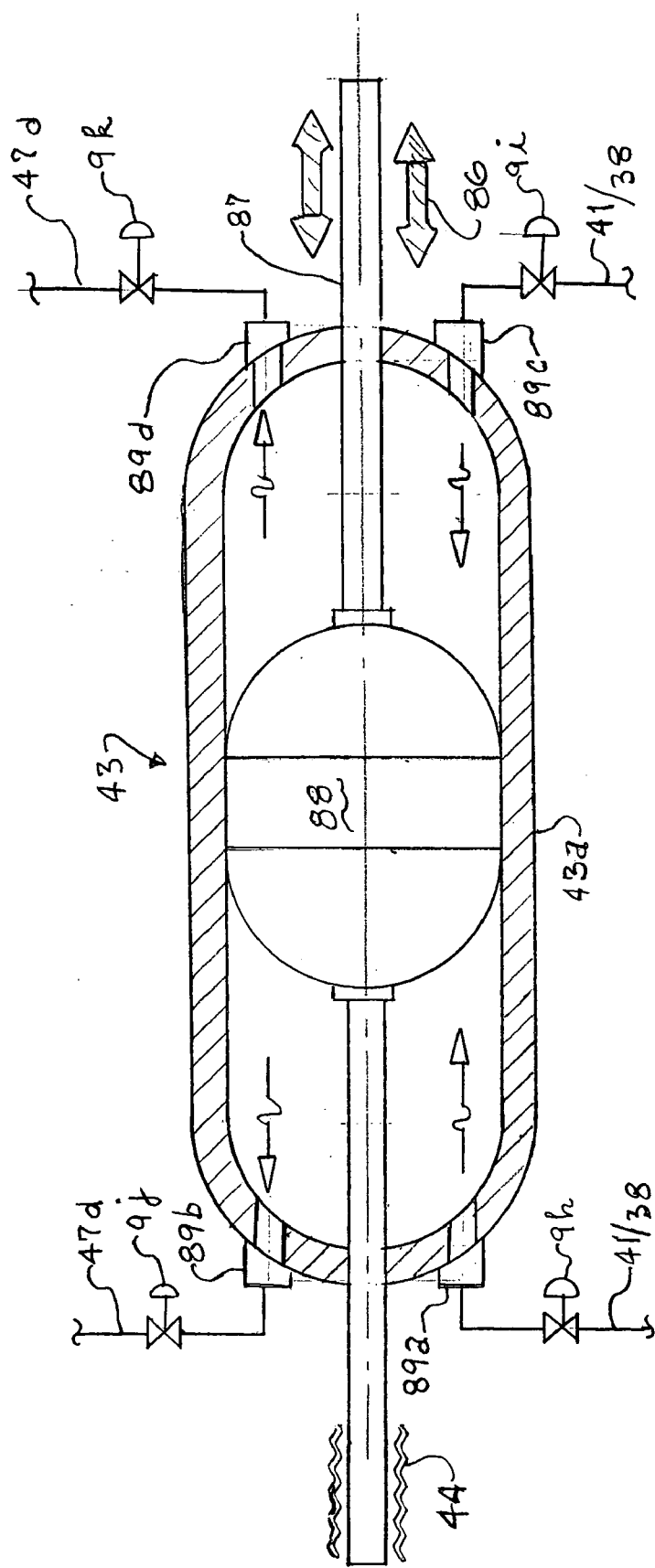
FIG. 4 is a detailed view in section, of a double acting free piston gas motor that can be used in the invention.

As seen from the description of FIG. 1 above, the thermal compression engine assembly preferably comprises a bank of gas reactors. The reactor effluent is at elevated pressure and temperature and preferably is mixed with low-pressure secondary gases. By increasing the pressure of the compressed air, the pressure of the reactor effluent is also increased. Power Gases produced are expanded through mechanical devices such as rotary gas motors 40,73 and double acting reciprocating pistons as shown in FIG. 4 to produce useful work such as electrical or mechanical output.

Accessories may include a fuel system and compressed air charging system. Preferred fuels are Ethanol, compressed natural gas, hydrogen and good grades of coal gas. The air compressor is charged with water that is evaporated in an amount required to absorb heat of compression. Also compressed air is cooled in between stages of compression and further cooled before charged into the reactor vessel.

The fuel burns in the reactors to develop reactor gases that are products of combustion and excess air remaining in the reactor. These products of combustion are at elevated temperature and pressure and contain all the energy developed in the system. The enthalpy in the reactor effluent contains energy provided by all influents into the reactor. The influents contain the energy in the fuel charge, energy stored in the compressed air charge and heat due to exothermal reaction and chemical changes as a result of burning of the fuel. The reactors operate cyclically. During the first part of the cycle the fuel burns to develop the elevated temperature and pressure gas in a programmed time or set point temperature. Subsequently the reactor gases at elevated temperature and pressure are displaced by Secondary Gases in the reactor chambers and also mixed with further Secondary Gases that are inducted into a venturi mixer [FIG. 3] powered by the high-pressure products of combustion. The intimately mixed gases are buffered in a mixing chamber adjacent to or contiguous to the reactors to yield Power Gas used in the work zone at a temperature and pressure less than that of the reactor gases and more than the temperature and pressure of the Secondary Gases. A plurality of gas reactors subsequent start and operate in a sequence such that a constant stream of products of combustion are available as demanded by the driven loads. Each reactor new cycle starts when reactor chambers are charged with fresh compressed air.

At partial loads the reactor gas, secondary gas and Power Gas are modulated by automatic adjustment of flow and pressure. When operating at maximum load the reactors operate in continuous sequence to maintain continuous flow to produce a steady stream of power gases. During this process one bank of reactors is in the charging and firing cycle while another bank of reactors is in the mixing and gas supply mode. Additional reactors are used depending on the load characteristics. The power Gas is stored in an accumulator tank to enable an adequate and continuous supply to the gas motors. Hydrocyclones may be provided to scrub the gases and remove condensed water that is stored in a wastewater tank and a water pump can be used to inject water into air compressors and gas reactors. Chemicals may be added to maintain water at a predetermined chemical purity. Chemical impurities can be precipitated and removed by filtration.

Gas reactors, 24, 25 and 26 may be fabricated from a straight section of pipe with pressure-tight end plates 17a and 17b and means for restraining reactor vessels from thermal expansion. At a first end the of the gas reactor cavity, a ceramic lined flame retainer is concentrically placed. The flame retainer [FIG. 3] preferably has a perforated diverging and solid converging section terminating in a gas ejection nozzle. The interior walls of the Gas Reactor are lined with refractory high temperature insulation and exterior walls are also insulated. All systems are automatic with computers monitoring and control. All tanks and the Reactor are fitted with over pressure valves for safety. Pressure, temperature, flow meters, timers, oxygen sensors and other sensors regulate the process. Said Gas Reactor cavity is partitioned into a first Chamber within said flame retainer and Second Chamber at annulus between exterior of flame retainer and interior perimeter of said Gas Reactor.

With reference to FIG. 3, the fuel and Oxygen-containing gas are intimately mixed by induction due to the expansion of the higher-pressure fuel entering the flame chamber 27. The intimately mixed fuel and oxidizing gases are introduced into burner nozzle ring 15. Electronic igniter 82 initially lights the flame 28. The burning fuel generates heat. The products of combustion flow from the first end 24e [FIG. 2] of the reactor 24 toward the second end 24f of the reactor into the diverging section 27a of the flame retainer 27. The products of combustion are ejected from the nozzle 27c on the downstream end of the solid converging section 27b of the flame retainer. The thermodynamic process in the reactor is constant volume adiabatic whereby the temperature and pressure of the reactor gases increases to a predetermined value. The hot products of combustion ejected via nozzle 27c are mixed with the compressed air charge resident in the annulus space 27d between the flame retainer 27 and the interior 22a of the gas reactor. Rapid gas circulation is setup with gases flowing from chamber 27 into annulus 27d of the gas reactor. The buoyancy of the circulating gas drives air into the flame ring structure 60 containing air inlet nozzles 60a and fuel inlet nozzles 60b which are symmetrically arranged with respect to the longitudinal axis of reactor 24, a second stream passes through perforations 27e in the diverging section 27a of the flame retainer 27. At the same time the circulation of the reactor gases cools the flame and reduces the $NO_x$ produced. Also local circulation of said reactor gases brings all the species in the gases in intimate contact thereby completing combustion of fuel components including substantial conversion of Hydrocarbons and Carbon Monoxide to steam and Carbon Dioxide. When the reactor gases reach a predetermined condition, the reactor gases are discharged into a mixing tank 36 as described above.

To complete the description of FIG. 3, sight glass 30 is provided in a customary fashion. Thermocouple 19 monitors the temperature while the oxygen sensor 81 monitors the oxygen concentration, the outputs of which are sent to computer 1. Air inlet 16a and gate 59 are described with respect to FIG. 2 below. Each reactor 24, 25, 26 has interior insulation 23 and exterior insulation 31.

The expansion devices shown in FIG. 1 may be gas motors, including low temperature and low-pressure turbines, single or double acting reciprocating piston or other suitable devices. Gas motors are adapted to specific applications, such as a power plant for auto-propelled units. Rotary gas motors have operating characteristics that match loads and when used in suitable configuration can be used as torque converters obviating conventional gears and transmissions. Double-acting free piston gas motors controlled with automatic gas flow valves are suitable for other load applications. For instance, reciprocating units are used as a subsequent expansion device following a rotary gas motor. Design of reciprocating free pistons includes stroke length and volume displaced to obtain gas expansive power at the tail end of the power cycle. This system also has the flexibility of operating at full pressure [like a hydraulic cylinder]. The average pressure is double compared to present reciprocating engines. The linear-generators used with double acting reciprocating gas motors have capacity control and electronic controls by modulating magnetic forces for efficient operation. Gas motors for racing vehicles using this invention will have maximum indicated pressure that will exceed the state of the art operating on a mean effective pressure that is about 50% of the maximum pressure. This advantage provides an opportunity for challenging land and water vehicle speed records. Also with power regeneration during deceleration around turns and obstacles, power gas regeneration will boost performance and reduce fuel use. The art of design of racing vehicles depends on features provided in this invention merged with design to reduce weight, wind resistance and stability of the vehicle.

The oxygen-containing gas is preferably compressed air. The oxygen concentration of the air can be increased by further compression and cooling of the compressed air to make the reactors physically smaller. In a remote process, air can be enriched with oxygen. Compressed air can be directed to a pressure swing adsorption (PSA) unit that strips the nitrogen from the air resulting in air containing a higher concentration of oxygen.

Reactor gases at elevated temperatures and pressures can be used more efficiently for space heating systems with a variety of fuels. For cogeneration the higher pressures are used for powering gas motors to produce electricity. For space heating, the ambient air is charged with hot reactor gases to produce warm air that is circulated in occupied spaces for comfort. Elevated temperature and pressure gases are bled into the secondary gases as required. Also building air quality is improved by charging excess air into the reactors and by mixing ambient air with the power gases as shown, e.g. in FIG. 1. See eductor 37a. The gas pressure drives the air through the air distribution system and filters. Auxiliary fans may be used for exhaust and ventilation, while relief dampers can maintain building air balance.

Some other typical uses for the elevated temperature and pressure gases are distributed to numerous sites for cooking, heating water and drying clothes and other purposes. The fuel is selected as most appropriate for the application. Homes and smaller buildings can be standardized with all 120 volts power and avoid using 240 volts single-phase electrical power. Instead of using electrical power, appliances can utilize high temperature and pressure conditioned gas to operate controls with thermoelectric power and gas motors. Building service voltages can be provided with more efficient voltages from the utility as 208 volts and 460 volts. Electrical power from utilities are inefficient and on a macro scale produce significant environmental impact, are exposed and subject to sabotage and self controlled rolling brown out and blackouts by means of switch-gear designed to trip during ground fault or short-circuit condition. Also substations are used in numerous locations in urban and rural areas and are vulnerable to damage by lightning and other forces. Less dependence on the grid improves the reliability of operation of the building.

Preferred Embodiment One

Gas Reactor Engine System

This embodiment is preferably a power plant for a self-propelled vehicle.

Figure 2:
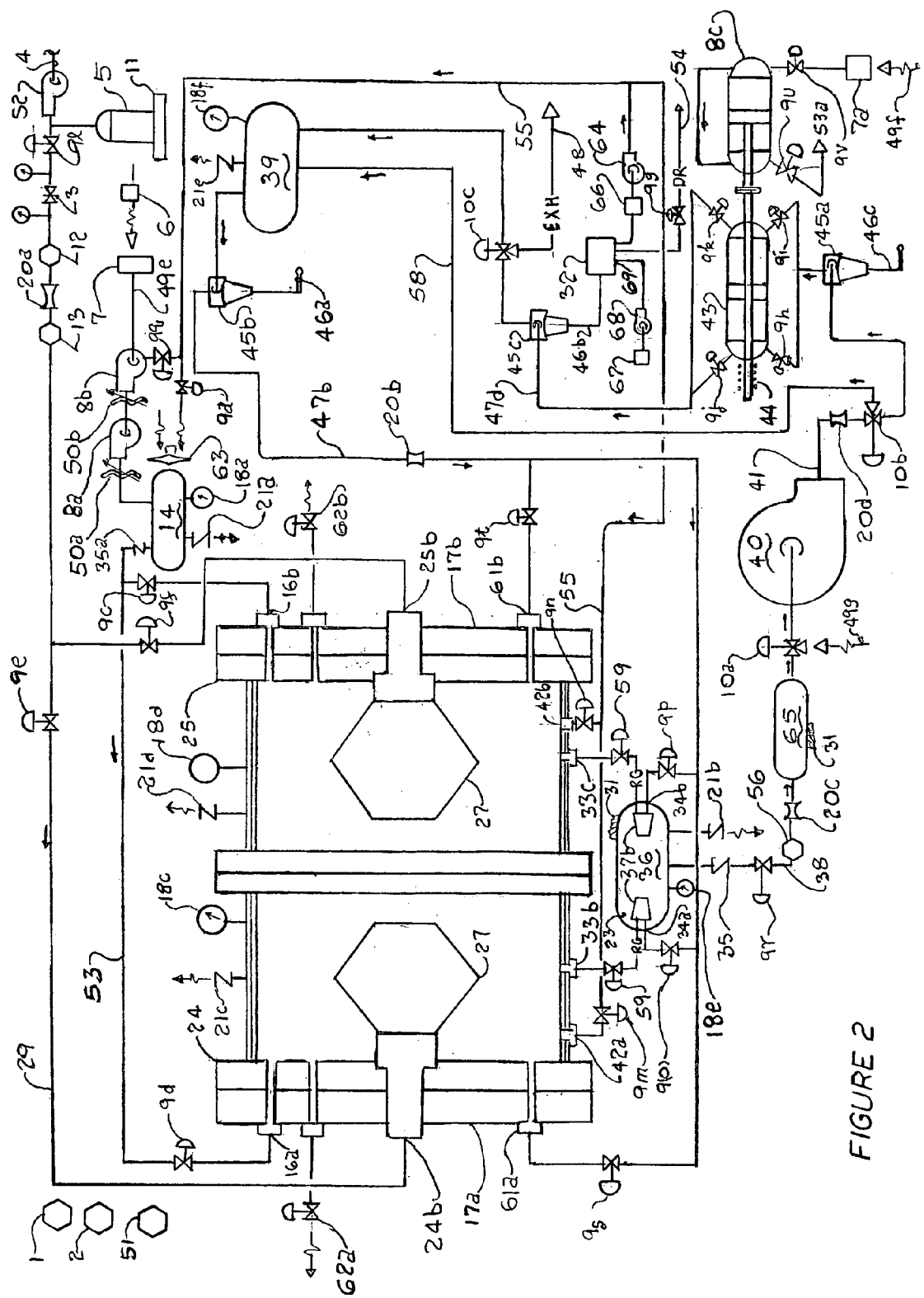
FIG. 2 is a schematic view of another embodiment of the invention.
Figure 3:
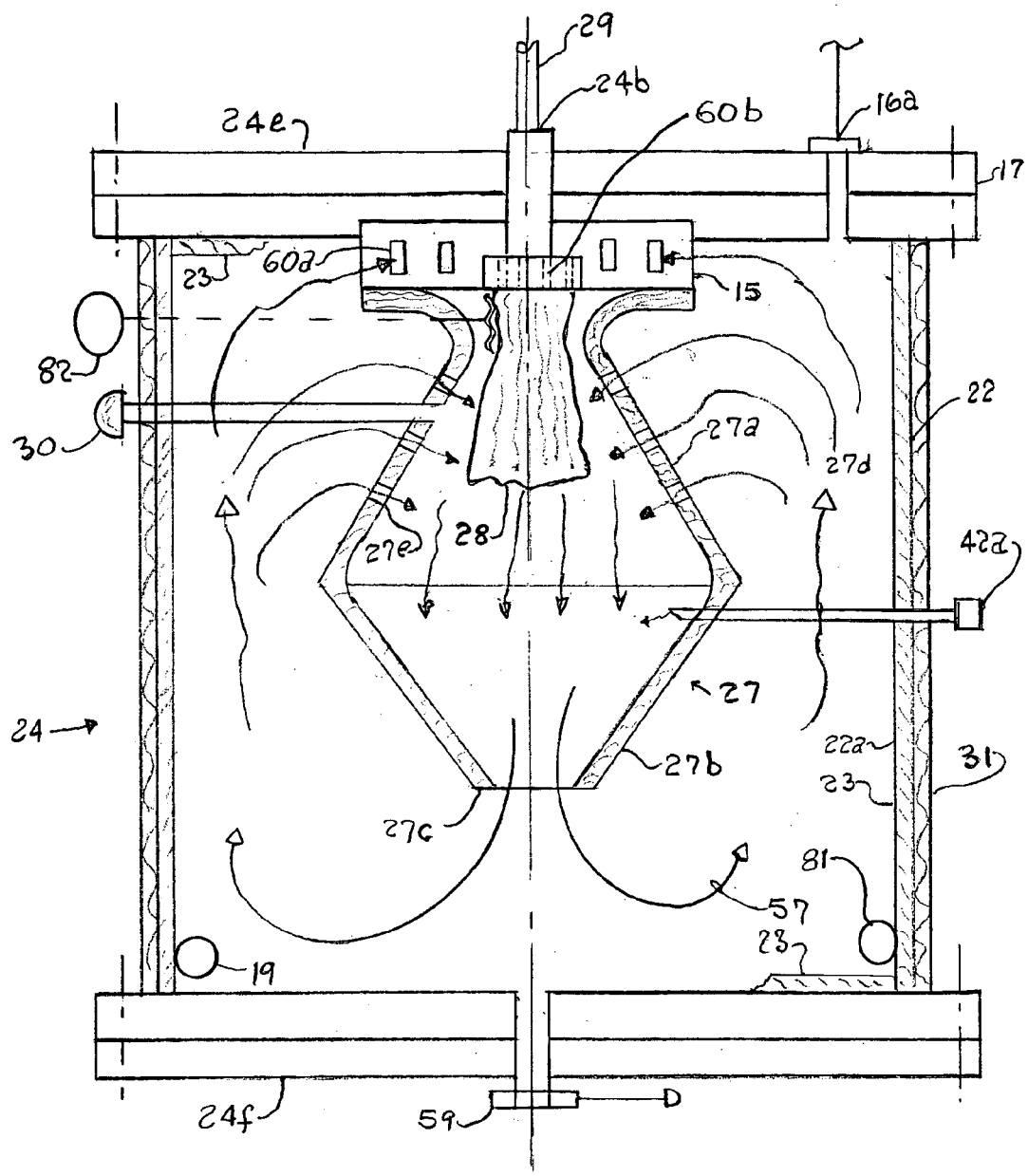
FIG. 3 is a detailed view, in section, of a preferred embodiment of a gas reactor employed in the invention.

With reference to FIGS. 2 and 3, the system depicted represents a design of a 220 HP output using compressed natural gas as the fuel. The expected indicated efficiency is 85% and brake efficiency is 79%. Two Gas Reactors, 24 and 25 operate in sequence so that there is a continuous flow of products of combustion. There are many variations to the composition of natural gas. This embodiment is presented as burning 100% Methane. The system is programmed for monitoring and automatic control with a suitable computer 1 and master timer 51 with provisions for manual and override controls. The useful work output of the gas motors is electrical or mechanical. Electrical energy is stored in a bank of batteries, 2. The process of operation is described below.

Ambient air at 60° F. and 50% relative humidity passes through air intake 6 and filter 7 and the gas stream of filtered ambient air 49e flows into two stage compressors 8a and 8b and through inter-stage cooling 50a and 50b. Water is injected by opening valve 9q to further cool the compressed air to 90° F. by evaporative cooling system 63 with water from water pump 64 via line 55 and thence through water flow control valve 9a. The compressed air is stored in accumulator tank 14 with pressure sensor 18a and overpressure valve 21a. In the first cycle reactor 24 is charged with compressed air. The oxidizing gas stream, 53 is compressed air at 125 PSIA flowing at a rate of 21.4286 cubic feet per minute with valve 35a to prevent reverse flow. During compression 0.3684 pounds of water per minute is injected into the compressor. Also 0.072 pounds of water is entrained in the ambient air sucked in by the compressor.

The liquid natural gas cylinders 5 are on electronic weigh scale 11 in 60° F. environment. Alternatively the fuel gas is supplied from utility pipe 4 and utility gas compressor 52, through gas manifold 3. The fuel gas valve train 12 is installed to comply with applicable code and safety requirements. The Gas stream flowing in line 29 is 0.4533 pounds per minute 1000 PSIA natural gas with combustion heat input of 10,816 BTU per minute. The fuel gas flow rate in line 29 is regulated by output signals from flow sensor 20a. The reactor cycle is initiated by opening natural gas valves in manifold 3 and valve 91. The fuel air mixture is ignited with electronic pilot igniter 82 [FIG. 3] and the flame is optimized by thermocouple 19 [FIG. 3]. The fuel/air flash back arrestor 13 prevents the flame from backing into the gas system.

The stoichiometric flows of fuel and air are 17.4 pounds of air per pound of natural gas. The fuel is regulated by valves 9e or 9f and supplied to burner nozzle ring 15 [FIG. 3] at fuel ports 24b and 60b. The gas entry end of the flame retainer 27 [FIG. 3] has combustion gas openings 60 equally and evenly spaced around the ring 15. Reactor 24 and reactor 25 operate in sequence so that a continuous stream of hot gases is produced. Oxygen sensor 81 [FIG. 3] monitors oxygen remaining in each reactor during the process.

The flame can be observed through sight glass 30 [FIG. 3]. The flame profile 28 is contained within the flame retainer 27 fabricated from refractory ceramic fibers and having a perforated diverging section 27a and a solid converging section 27b. The heated gases from the flame zone expand rapidly to the outlet nozzle 27c of the flame retainer. The hot gases inside the flame retainer 27 force the circulating gases 57 into the annular space 27d between the flame retainer 27 and outer wall 22a of each gas reactor 24 and 25. The local gas pressure differentials causes rapid circulation within the reactor chamber. The circulation during a seven seconds cycle provides residence time and circulation to reduce flame temperature and reduces $NO_x$ production and completes combustion to eliminate traces of raw fuel and Carbon Monoxide.

Each gas reactor 24, 25 is fitted with a pressure tight cover 17 and body 22. The reactors 24, 25 and mixing chamber 36 are internally lined with three inches refractory and three inches external insulation. The reactor flame raises the temperature of the mixture of gases to 2783° F. Water in the amount of 0.8571 pounds per minute flow is controlled by valves 9m and 9n and is injected through inlets 42a or 42b. Further 1.02 pounds per minute of water is produced due to fuel combustion. Next the high temperature valve 59 [FIG. 2] opens and 14.9021 pounds per minute of reactor gas at a pressure of 891 pounds per square inch and at 2783° F. [with molecular weight of approximately 27.17 pounds per pound mole] flow into eductors 37b inside mixing tank 36 with pressure monitor and sensor 18e and over pressure relief valve 21b. The other gas stream to eductor 37b is 59.6084 of Secondary Gases at 20 PSIA at 200° F. from tank 39 and through hydro-cyclone 45b discharging wastewater 46a. Control valves 9o or 9p regulates flow of the secondary gas to inlets 34a or 34b. At the same time as the reactor pressure drops the secondary gas controlled by valves 9s and 9t flows into inlet 61a or 61b into reactors 24, 25. The reactor gas stream 33 and the Secondary Gas stream 47b with flow regulated by controller 20b enters ports 34a or 34b to eductor 37b in mixing tank 36. The gases are thoroughly mixed to yield Power Gas stream 38 exiting mixing tank 36. One direction flow valve 35 prevents back flow of Power Gases from flowing back into the mixing chamber 36. The Power Gas flows into tank 65 and gas flow is controlled by monitor 20c and valve 9r. While reactor 24 is discharging reactor effluent, reactor 25 starts the charge and firing cycle. Reactors 24, 25 operate to provide a continuous flow of reactor effluent to meet full load demand. Each reactor operates for about seven seconds alternately controls override timer 51 to maintain temperatures and pressures of reactor effluent. Reactors 24, 25 are fitted with over pressure valves 21c and 21d and pressure control monitors 18c and 18d. Vent valve 62a or 62b opens before charging compressed air into reactor so all products of combustion may be scavenged from the reactor vessel.

Power Gases 38 at 194.2 PSIA at a temperature of 760° F. and flow rate of 74.5105 pounds per minute are stored in tank 65 for the smooth use of Power Gas supplied to the rotary gas motors 40 to drive the load or vehicle. Power Gas flow rate, temperature and pressure are controlled for a versatile power plant and in some cases transmission gears may not be required. The torque controller 56 of the rotary gas motor 40 is matched to the load characteristics. At low speeds the torque is the higher and maximum at zero speed. The partially expanded Power Gas discharges from the gas motor 40 via line 41 through controller 20d and is passed through a hydrocyclone 45a. Liquid in line 46c contains a portion of absorbed Carbon Dioxide and Oxides of Nitrogen that are removed and sent to tank 32. Water in tank 32 is controlled for neutral pH with suitable chemicals. Automatic valve 9g is opened to discharge wastewater 54 to suitable drain. Also during the deceleration mode, valves 10a and 10b on suction and discharge of the rotary gas motor are actuated to direct regenerated gases 58 to tank 39 to be used in the process for developing free energy. Ambient air 49g is drawn in through valve 10a.

Control valves 9h, 9i, 9j and 9k operate in sequence to drive the double acting reciprocating gas motor 43. The gas motor 43 drives the linear generator 44 and double acting reciprocating air compressor 8c that discharges compressed air 53a and draws in ambient air 49f through filter 7a. The free piston 88 [FIG. 4] is also controlled electronically by controlling magnetic forces in the linear generator. Secondary gas stream then passes through hydro-cyclone 45c and wastewater 46b. Control valve 10c proportions the gas flow so that 14.9 pounds per minute at 200° F. of the gas stream 48 is exhausted and 59.61 pounds per minute of the gas is diverted to tank 39 with over pressure release valve 21e and pressure monitor and controller 18f. The effluent 46 from cyclone is directed to waste liquid tank 32. Water pump 64, with inlet filter 66, supplies water stream 55 to injection points at air compressor 8a, and reactors 24 and 25. Tank 32 has automatic valve 9g to regulate excess water to drain. Chemical handling system for pH control 67 and chemical feed pump 68 supply metered charge to inlet 69 in tank 32.

With reference to FIG. 4, the gas motor 43 has a free piston 88 inside cylinder 43a, coupled to linear generator 44 and external load 86. Partially expanded gas in line 41 or Power gas in line 38 enters the cylinder 43a through solenoid valves 9h or 9i into ports 89a or 89c. Expanded secondary gas exits ports 89b or 89d and through solenoid valves 9j or 9k and then flows through line 47d as described above.

The capacity of the tanks is less than 10 cubic feet. Sizing of accumulator tanks will be significantly influenced by size and space limitations and fine tuning gas flows to ensure smooth operation of the gas motors under all designed load conditions.

Preferred Embodiment Two

Ethanol for Self-Propelled Power Plant

Generally this embodiment is the same as Embodiment One. Ambient air and compressed air conditions are generally the same. Each gas reactor cavity is four cubic feet to provide adequate mass of air and products of combustion to lower reactor temperatures. In this Embodiment the thermal compression engine operates by burning ethanol containing 95% fuel and approximately 5% water including denaturing agents. A state of the art fuel injection system is installed to operate the gas reactor on a variant timed cycle initially set at seven seconds. Reactor Gas temperature is approximately 2100° F. and pressure is 736 PSIA. Water is injected into the air compressor at 0.6046 pounds of water per minute. There is enough water in the system produced by combustion and water contained in the fuel—little or no water injection is required. Fuel flow rate is 0.8915 pounds per minute.

Thermal efficiency is expected to be 85% and brake efficiency is expected to be 79%. The Power Gases are at about 600° F. at about 160 pounds per square inch absolute with a flow rate of 113 pounds per minute. Atmospheric emissions are expected to be traces of Hydrocarbons, Carbon Monoxide and Oxides of Nitrogen and less than 2% Carbon Dioxide as a tail pipe emission. Mass emissions from the reactor is expected to be 5% Carbon Dioxide and about 3% mass emissions based only on the combustion process.

Preferred Embodiment Three

Fuel is Ethanol for Stationary Power Plant

This embodiment is suitable for larger plants for utility systems. This embodiment represents a One Megawatts module. The gas reactor is charged with 25 cubic feet compressed air at 125 PSIA. About 3.67 pounds of water per minute based on 0.726 pounds of water entrained by ambient air is charged into air compressors to absorb heat of compression by evaporation to facilitate isothermal compression. The fuel contains ninety five percent Ethanol and about 5% water. The fuel rate is about seven pounds per minute. The Molecular Weight of products of combustion is estimated at 28.32 pounds per pound mole and is close to that of air. The concentration of pollutants in atmospheric emissions is estimated to be traces of Hydrocarbons, Carbon Monoxide and Oxides of Nitrogen and less than 2 percent Carbon Dioxide. The Overall thermal efficiency is expected to be eighty nine percent and brake efficiency is expected to be eight two percent. The pressure of the secondary gases is one hundred and seventy six pounds per square inch absolute at six hundred and fifty degrees F. at the rate of 715 pounds per minute.

Stationary plants are designed for power generation at the lowest possible cost while space and weight do not have significant limitations. The secondary Gas Stream is preheated ambient air or recirculated expanded gases. The water contained in the working gases is extracted in a condenser by expanding to a vacuum, approximately three pounds per square inch absolute. The exhaust gas temperature is about 140° F. Heat of water condensation is recovered. When ambient air is preheated and energized with reactor gases, the pollutants are diluted to 20% concentration in the reactor exhaust stream. The temperature of reactor gases at 2100° F. produces negligible Oxides of Nitrogen while extended "cooking" time with optimum flame modulation, the fuel components combustion is complete producing Carbon Dioxide and water. Further the power generation equipment is shrouded and insulated to recapture radiated heat losses to maximize thermal efficiency. Most processes are substantially reversible with a small increase in entropy. The air compressors are driven by direct power take off from the main power shafts or driven by a separate turbine to avoid irreversible process associated with electrical drives and the higher cost of electrical power. A pony motor is used to maintain compressed air charge in the air accumulator tank for initial startup.

Preferred Embodiment Four

Solar System

Gas Reactors are installed to use solar energy efficiently and cost effectively. This invention takes advantage of solar energy as a supplemental system or a full-scale solar system. Gas Reactors can be placed under ground with perfectly insulated shroud or placed to pick up solar heat directly. Solar concentration systems are used to heat an heat exchanger medium to 3000° F. The heat transfer medium is circulated into the reactor to heat precharged compressed air to about 2500° F. Reactors can be installed at the site or remotely. Solar energy can be collected continuously while reactor energy requirements can be supplemented by a fuel as required. Air is locally compressed with water injection and cooling to approximate isothermal compression; further air-cooling is accomplished with evaporative cooling. Reactor charging air pressure is based on the highest pressure required in the system. Output for power generation is continuous or operated part-time. Fuel is used based on priority of demands.

Temperatures in the reactors is maintained in the range 2000° F. to 3,000° F. and the pressure of Reactor gases can reach 1000 pounds per square inch and higher. Secondary Gases are expanded to below atmospheric pressure and entrained moisture is condensed and heat reclaimed by preheating ambient air in the condenser. Power is generated continuously and fuel used is reduced based on availability of solar energy. Siting of plants is expected in areas with high average annual insolation rates [about 7 KWH per square meter] and also away from populated areas with little affect in the regional air quality.

Additional Advantages

This invention is suitable to use many gaseous and liquid fuels with similar output per million BTU. Fuel flow rate depends on heating value of the fuel. It is suitable for continuous operation with Ethanol containing a significant amount of water. This means that the cost of large-scale manufacture of Ethanol is economical and is competitive to market clearing price per million BTU. Ethanol is produced as an agricultural product with solar energy as the source of power. A fully developed Ethanol industry will generate many local jobs and transfer energy revenue from Arab countries to the US economy. Also converting from gasoline to compressed natural gas will favorably modify the US and Global oil economy.

Solar systems are capital intensive and require large areas of land. This invention works well when used in combination with concentrator solar collectors wherein solar energy may independently operate the gas reactor, or when the sun is not providing the energy needed, the reactor utilizes the extent of solar energy available and thereby the system becomes cost effective. Further if reactors are placed under ground parasitic heat losses are prevented to enhanced thermal performance.

Natural gas is presently piped in a national network. A national infrastructure for dispensing stations can be developed in a very short time and for a low cost.

Present automotive engines produce substantial pollution and consume more fuel at traffic gridlock episodes and at "stops" during transit where engines are operating at part load and low efficiency. This engine of the invention can be shut off at stops and traffic-jam episodes while stored power gases drive the vehicle at low loads. Atmospheric emissions during traffic congestion is substantially less and alleviates pollution in crowded cities, for instance Mexico City and many cities in the Third World.

This engine of this invention operates at optimum efficiency at all loads.

The gas motors of this invention operate at temperatures of 600 to 1000° F. depending on the fuel and load characteristics. The cost of fabricating suitable gas motors is significantly less than the turbines designed for high temperature operation. The gas motors of this invention are lighter and easier to operate and control.

The gas motors of this invention operation characteristics, specifically when torque is compared with speed, are suited for automotive applications. In fact, gas motors operated in parallel or series operate as torque converters with maximum torque at zero speed and progressively lower torque with increasing speeds. The power output is leveled with a constant product of torque and speed. Many vehicles can be successfully operated without transmissions.

The parasitic power for compressing air is higher for the state of the art engines. Gas turbines require about 67% power to operate the air compressor and about 30% is required to operate the air compressors for four stroke engines. For this invention about 16% power is used to operate the air compressors and much of this energy is recovered in reversible cycles. Also most state of the art gas turbines are directly coupled to the air compressor and deteriorate performance with varying turbine speed that directly affect compressor efficiency. This invention uses compressed air in a uniform mode and air compressor efficiency is independent of external loads.

For this invention the formation of Hydrocarbons and Carbon Monoxide is detectable traces approaching zero. Controlled flame and products of combustion temperatures produce very low concentrations of Oxides of Nitrogen. Gaseous and atomized liquid fuels burn completely and no particulate emissions are expected.

Power systems can be designed as distributive power systems with rotary or reciprocating gas motors. The applications for such systems are numerous, for instance, trains can be designed with each car self powered so the train can operate without locomotives with connections for power gas from a central source or within the car. During braking or deceleration the multitude of said gas motors regenerate power. The energy recovery will improve the overall efficiency. Since turbines coupled to a multitude of axles absorb the momentum energy the stopping distance of the train will be significantly reduced to a range that is within the visual range of the operator and significantly reduces at grade crossings disastrous accidents. The working fluid is power gases with higher efficiencies than electrical systems that require irreversible processes and additional weight of motors and generators.

EPA has promulgated the concentrations and mass emissions of $NO_x$ considered as a pollutant and to contribute to Global Warming. The production of the gas is dependent on flame temperature that can be easily regulated based on the application so that $NO_x$ emissions approach zero.

During very low speeds and during the deceleration the flow of reactor elevated temperature gases stops. The secondary gases are only used. On a time basis the use of combustion gases is much less than the state of the art and average atmospheric emissions are less.

With a more efficient and quiet power plant installed for lower capital costs, distributed power generation systems will provide immense economic advantages and alleviate loading of local, regional and national electrical grids and also the impact of rolling blackouts or brown outs. The utility, by law, pays back at current rates to the client for electrical energy generated at the local site and returned to the power grid. High rise buildings, for instance, can generate power continuously with revenue, particularly during off-hours, that will amortize the investment and operating costs. The cost of locally generated electrical power is much lower. Power generated by utilities is not efficient due to additional energy losses for voltage transformation at the generating side, long distance transmission line grids, voltage transformation at the supply end and distribution losses at the supply end. The net efficiency of electrical power from the grid is about 30% compared to about 80% for onsite power. Farther this significant gain in efficiency for utilization of said electrical power substantially reduces atmospheric pollutants and Global Warming gas issued into the atmosphere.

This engine system has been designed to imitate nature and natural processes for becoming the most efficient and cleanest engine available. The sun is a permanent source of "high quality heat" at elevated temperatures. More energy is utilizable at the top of the temperature scale and is meted out to match load conditions at much lower temperatures. The land and sea winds, ocean tides and plant growth [ethanol is produces with solar energy] operates in an energy cycle and nature has numerous other cycles. Most of nature's cycles are reversible and are not accompanied with an increase of entropy. Relatively Small amounts of energy are lost, except on a clear night, the cloud cover insulates the Globe. Also solar infra red radiation penetrating certain atmospheric gases changes wavelength. When the solar rays are reflected from the surface of the earth they often bounce back simulating another reversible cycle. Nature also has atmospheric mass transfer processes to clean atmospheric pollutants with acid rain or absorption of gases like Sulfur Dioxide and Oxides of Nitrogen. The solubility is inversely proportional to the temperature and directly proportion to the pressure. The gases are removed by absorption into solution with removal of the water and dust in the form of rain and land deposits. Even lightning energy is generated as a by-product within cumulous clouds that develop positive and negative charges released as a form of energy balance in the wind and hydrological cycle.

This invention endeavors to operate in similar processes for efficient and clean production of energy. The components are insulated to conserve energy in high temperature regimen with extended residence time for burning fuel with rapid circulation and flame modulation that all but eliminates Hydrocarbons and Carbon Monoxide. Secondary circulating gases, like the land and sea breezes, significantly dilute the pollutants and are used at a lower temperature level. The secondary gases are scrubbed to remove some of the Carbon Dioxide and Oxides of Nitrogen held in solution. Most of the processes are reversible to reduce the mass emissions, and tail pipe emissions are diluted and extremely clean. Also in automotive power plants the gas is the working fluid and power is directly regenerated during the deceleration mode; proximating another reversible cycle permitting "jackrabbit" starts the next time the vehicle moves—this is akin to the lightning strike.

The efficiency of this invention engine is not affect by altitude above sea level.

Catalytic converters or other devices are not required to process exhaust gases to comply with legal emissions requirements.

This invention engine is very quiet during operation and does not require any sound attenuation devices.

Piston engine has about 70.7% of axial force of expansion with sideways thrust and associated problems. Rotary gas motors and double acting reciprocating pistons do not have this problem.

Piston engines with instantaneous explosions have a mean effective pressure about 50% of maximum pressure. This invention produces continuous maximum power based on the design of the expansion device.

Ethanol conversion reduces evaporative hydrocarbon emissions during fueling of vehicles.

Reactor gases when distributed from a central source provide enhanced thermal efficiency and economic efficiency for appliances such as space heating, hot water heating, gas cooking and clothes drying. Utility Electrical energy is about 35% efficient at the point of use. Conversion to gas operation on a large scale is beneficial to the environment.

What is claimed is:

1. A method for producing power from combustion of a fuel which comprises:
    a. feeding a pressurized Oxygen-containing gas and then a combustible fuel to a first combustion zone of constant volume to form a combustible mixture therein combusting said combustible mixture in said first combustion zone under substantially adiabatic conditions to form gaseous combustion products and exhausting said gaseous combustion products from said first combustion zone at a first predetermined range of elevated temperature and pressure in a first cycle;
    b. feeding a pressurized Oxygen-containing gas and then a combustible fuel to a second combustion zone of constant volume to form a combustible mixture therein combusting said gaseous combustible mixture in said second combustion zone under substantially adiabatic conditions to form gaseous combustion products and exhausting said gaseous combustion products from said second combustion zone at said first predetermined range of elevated temperature and pressure in a second cycle;
    c. feeding said exhausted gaseous combustion products from each of said combustion zones to a mixing zone, forming in said mixing zone an admixture of said exhausted gaseous combustion products and a secondary gas at a second predetermined range of temperature and pressure lower than said first predetermined range; and expanding said admixture in a work-producing zone whereby work is generated by said expansion;
    d. alternately repeating said first and second cycles, each of said cycles being operated to provide a substantially continuous stream of exhausted gaseous combustion products sequentially from said first and second combustion zones to said mixing zone; and e. feeding the admixture of said exhausted gaseous combustion products and said secondary gas to said work producing zone.

2. The method of claim 1, wherein said secondary gas is ambient air.

3. The method of claim 1, wherein said secondary gas is provided by recovering at least a portion of said expanded gases and recycling said portion to said mixing zone.

4. The method of claim 1, wherein three or more combustion zones are provided.

5. The method of claim 1, wherein a flame is propagated in each said combustion zone and water is introduced into each said combustion zone to cool said flame and reduce the temperature and increase the weight of said gaseous combustion products.

6. Apparatus for producing power from combustion of fuel, which comprises:
   a. a plurality of gas reactors, each said gas reactor having an elongated sealed housing of constant volume, inlets and outlets at opposite ends thereof, means for thermally insulating said housing and means for propagating a modulated flame within said housing;
   b. first conduit means communicating with said inlets for feeding a pressurized Oxygen-containing gas and then a combustible fuel to the interior of each of said reactors to form a combustible mixture therein;
   c. second conduit means communicating with said outlets for exhausting gaseous combustion products from aid reactors;
   d. means for producing work by expansion of gases, said work-producing means having inlets and outlets and third conduit means providing fluid communication between aid gas reactor outlets and said work-producing means inlets;
   e. first control means for operating said gas reactors to provide a substantially continuous flow of exhausted gaseous combustion products to said work producing means alternately and sequentially from said gas reactors; and
   f. mixing means for admixing a secondary gas with said combustion products to form an admixture of gases at a second predetermined range of temperature and pressure lower than said first predetermined range, said mixing means being between said gas reactors and said work-producing means, and means for feeding said admixture to said work-producing means.

7. The apparatus of claim 6, wherein said secondary gas is ambient air.

8. The apparatus of claim 6, wherein means are provided to recover at least a portion of said expanded gases and to feed said recovered portion as said secondary gas to said mixing means.

9. The apparatus of claim 6, comprising means for introducing water into said gas reactors to cool a flame therein, means for recovering at least a portion of gases exhausted from said work-producing means as said secondary gas, and means for cooling said secondary gas by expansion to condense at least part of water in said secondary gas, dryer means for removing condensed water from said secondary gas, and means for feeding dried secondary gas to said mixing means.

10. The apparatus of claim 6, wherein each of said gas reactors has opposed first and second ends, a centrally placed elongated flame retaining chamber within said housing between said ends and in communication with said gas reactor inlets, said flame retaining chamber having a flame regulation structure comprising combustion air inlets and fuel outflow nozzles, each of relatively large cross-sectional area and arranged symmetrically with respect to the longitudinal axis of said chamber to provide symmetrical flame propagation longitudinally into said flame retaining chamber, said flame retaining chamber having a diverging portion adjacent said first end and adjacent to the flame with substantial perforations for easy passage of local circulating products of combustion from an annulus space between the inner wall of said housing and the outer surface of said flame retaining chamber, while just downstream of the flame said flame retaining chamber converges and terminates in an ejection nozzle, whereby said gaseous products of combustion strike said second end of said reactor and whereby by thermal forces of said products of combustion are transferred to said first end of said reactor and thence through said perforations in said diverging section of said flame retaining chamber and through said combustion air inlets.

11. The apparatus of claim 6, comprising means to compress air to a predetermined pressure, substantially isothermally, by means of water injection and external cooling and means for feeding said compressed air to said gas reactors inlets.

12. The apparatus of claim 6, wherein said work producing means comprises one or more rotary gas motors, said gas motors being operated by said admixture of gases at said second predetermined range of temperature and pressure.

13. The apparatus of claim 6, wherein said work-producing means comprises one or more reciprocating gas motors.

14. The apparatus of claim 12, wherein said gas rotary motors are turbines each having an output shaft, and means are included to provide regulated and automatic controls of said turbines such that the output shaft torque is maximum at zero speed and is lower at higher speeds and suitably matched to self-propelled vehicles operating load characteristics, and wherein such turbines are mechanically coupled to loads in a manner to perform as torque converters such that mechanical power delivery transmissions are not necessary.

15. The apparatus of claim 12, wherein said rotary gas motors have a double acting free piston axially reciprocating in a chamber having a bore and a first end and a second end with shaft extensions for coupling loads and with means to inject and vent said secondary gas with automatic controls for rapid oscillation.

16. The apparatus of claim 6, wherein said rotary gas motors are provided in a self-propelled vehicle to power said vehicle, means for providing an admixture of products of combustion and a lower pressure secondary gas to said rotary gas motors during acceleration of said vehicle, means for providing ambient air to said rotary gas motor during deceleration of said vehicle, and means for storing pressurized ambient air exhausted from said rotary gas motors and for supplying said exhausted pressurized air to said rotary gas motors for subsequent accelerations of said vehicle.

17. The apparatus of claim 6, wherein said combustible mixture comprises air and a combustible fuel, heat-exchanger means for preheating said charged air before said combustible fuel is charged into said gas reactors, a solar-energy concentrator-collector means is provided remote from said gas reactors, and means is provided to transfer collected heat from said solar-energy means to said heat-exchanger means, said gas reactors being located underground.

18. The apparatus of claim 6, including means for computer monitoring and control comprising;
   a. means for operating safety and overpressure valves;
   b. means for regulating pressures and temperatures;

c. means for observing flame during operation;
d. means for proportioning and diverting flows of gas streams; and
e. means for switching entry and exit ports in said reactor and devices associated with operation of the system.

19. The apparatus of claim 6, wherein said mixing means includes a venturi-type nozzle therein for mixing said higher pressure combustion products with said lower pressure secondary gas with means for tangential secondary gas entry in the perimeter thereof, and said mixing means comprises a hollow cylindrical heat-resistant chamber with sealed ends and interior and exterior insulation.

20. The apparatus of claim 7, wherein a second work-producing means is provided in a heated space, and said second conduit means is operable to feed a portion of said gaseous combustion products to said second work-producing means and a portion to said heated space to heat said space.

21. The apparatus of claim 7, wherein said second conduit means is operably connected to and powers an energy consuming device selected from the group consisting of a distributive cooking means, a hot water heating means and a clothes drying means, and said second conduit means is operable to feed said gaseous combustion products to said energy consuming means to provide heat therein.

22. The apparatus of claim 6, wherein said gas motors are located at a plurality of load applications for stationary and portable power plants whereby forming distributive operation of systems.

23. The apparatus of claim 12 wherein the rotary gas motors are arranged in series.

24. The apparatus of claim 12 wherein the rotary gas motors are arranged in parallel.

25. The apparatus of claim 13 wherein the reciprocating gas motors are arranged in series.

26. The apparatus of claim 13 wherein the reciprocating gas motors are arranged in parallel.

27. The apparatus of claim 14 wherein the turbines are arranged in series.

28. The apparatus of claim 14 wherein the turbines are arranged in parallel.

* * * * *